April 15, 1930. J. M. WEYDELL 1,754,587
MAGNETIC CHUCK
Filed June 24, 1927
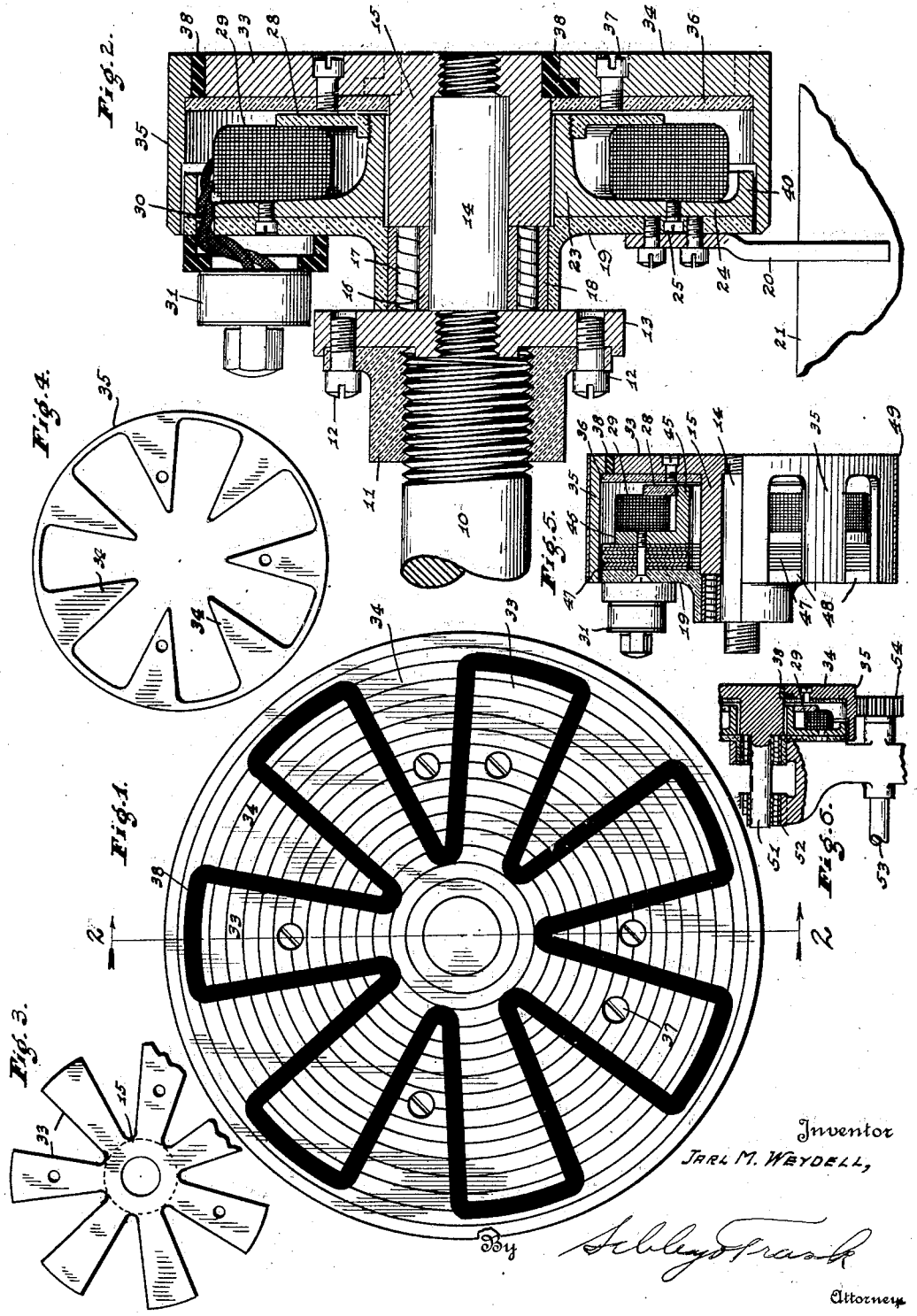
Inventor
JARL M. WEYDELL,
By Sibley & Frask
Attorney Patented Apr. 15, 1930

1,754,587

UNITED STATES PATENT OFFICE

JARL M. WEYDELL, OF INDIANAPOLIS, INDIANA, ASSIGNOR OF ONE-HALF TO EDWARD E. STOUT

MAGNETIC CHUCK

Application filed June 24, 1927. Serial No. 201,151.

It is the object of my invention to produce a rotary magnetic chuck suitable for mounting on the rotatable spindle of a machine tool. More specifically, it is my object to produce such a chuck in which there are no moving parts to which current need be supplied, thus avoiding the necessity for collector rings to conduct current to a rotating coil.

To accomplish the above object, I construct a chuck, the face of which, as is common, comprises a plurality of interspersed pole pieces of opposite magnetic polarity, and I mount on the chuck a member which carries an energizing coil and which is rotatable relative to the rest of the chuck in order that it may remain stationary while the chuck rotates.

The accompanying drawing illustrates my invention: Fig. 1 is a front elevation of the chuck; Fig. 2 is an axial section on the line 2—2 of Fig. 1; Fig. 3 is a front elevation of the chuck hub showing the radiating pole pieces with which such hub is provided; Fig. 4 is an elevation of the chuck rim showing the inwardly projecting pole pieces which lie between those of the hub; Fig. 5 is a quarter-section of a chuck embodying a slightly modified form of construction; and Fig. 6 is a fragmental section illustrating a modified form of mounting for my chuck.

The rotating spindles of machine tools are usually provided with a threaded end 10 on which a chuck may be mounted. I provide my chuck with a collar 11, preferably non-magnetic, having a screw-threaded axial hole adapted to be received on the end of the spindle 10, and I secure to this collar 11, as by means of screws 12, a plate 13 adapted to bear against the end of the spindle. To this plate is secured a stud 14 on the outer end of which the hub 15 of the chuck is mounted. Desirably, the stud is secured to the plate 13 and to the hub 15 by means of screw threads in order that the inner race 16 of an anti-friction bearing 17 may be clamped between the hub 15 and the plate 13.

On the outer race 18 of the anti-friction bearing 17, I mount a plate 19 preferably of non-magnetic material, such plate having secured to it an arm 20 adapted to bear against some stationary part 21 of the machine tool to prevent rotation of the plate 19. A core 23 having an outwardly extending flange 24 is secured to the plate 19 as by means of screws 25 which pass through the plate 19 and into the flange 24. That end of the core 23 which is opposite the flange 24 is provided with screw threads adapted to be received within a collar 28, between which and the flange 24 a coil of wire 29 is clamped. The wire ends 30 of the coil 29 are connected to any suitable source of direct current through a reversing switch 31.

The outer end of the chuck hub 15 is provided with a plurality of radiating fingers 33 which serve as one set of poles for the chuck. The other set of poles for the chuck is provided by a plurality of fingers 34 which extend inward from the periphery of a shell 35, such shell being arranged to receive within it the coil 29 and the flange 24. Desirably, the shell 35 is also deep enough to receive the stationary plate 19.

The shell is secured in place by means of a plate 36 of non-magnetic material which lies against the back of the fingers 33 and 34 and is secured thereto as by means of screws 37. The spaces between the fingers 34 of the shell 35 are larger than the fingers 33 so that a space is provided between the two sets of fingers, such space being filled with any suitable non-magnetic material 38, as is customary.

The chuck may be so constructed that a relatively small air gap is provided between the core 23 and the hub 15 and between the core-flange 24 and the shell 35, only sufficient space being needed at these points to insure that free rotation of the chuck will not be interfered with. Desirably, the flange 24 is thickened axially at its peripheral edge to provide a rim 40 which serves to increase the cross-sectional area of the air gap across which the magnetic lines of force pass from the core flange 24 to the shell 35.

In the modification of my invention illustrated in Fig. 5, I make the core for the coil 29 partly solid and partly laminated, the construction otherwise being substantially the same as that shown in Figs. 1 to 4 inclusive.

The solid portion of the core comprises a hub 45 and a flange 46, the coil 29 being held in place between the flange 46 and the screw-threaded collar 28. Interposed between the flange 46 and the supporting plate 19 are a plurality of laminations 47 of magnetic material through which the magnetic lines of force pass to or from the shell 35.

If desired, I may lighten the shell 35 by providing it with a plurality of slots 48 which extend through its circumferential wall. In order that the chuck, if so constructed, may provide a smooth outer surface tending to minimize the chances of accident, I provide a continuous band 49 which surrounds the shell 35 and covers the slots 48. The slots are preferably so located that the metal between them is located in substantial alinement with the fingers 34.

It is not necessary that the rotating member on which my chuck is mounted be a driving member. In Fig. 6 I have shown the chuck as carried by a rotatable shaft 51 supported in bearings 52 and adapted to be driven from a driving shaft 53 which carries a pinion 54 arranged to engage gear teeth on the shell 35.

In operation, my chuck is mounted on the spindle 10 by screwing the collar 11 thereonto. The arm 20 is then brought into engagement with some stationary part of the machine tool on which the chuck is being used, thus insuring that the plate 19 and the parts which it carries will remain stationary, while the remainder of the chuck is free to rotate. The work is held against the face of the chuck and the coil 29 energized by closing the switch 21. When the spindle 10 rotates, the face and rim of the chuck rotate, carrying with them the work which is secured to the face of the chuck by the magnetic field produced by the interspersed poles 33 and 34. The coil 29, during this rotation, remains stationary, and I am thus enabled to avoid the necessity for collector rings which would be required to supply current to the coil 29 if such coil rotates with the remainder of the chuck. When the work is finished, the spindle 10 is brought to rest, and the switch 31 is open. Desirably, the switch 31 is so constructed that it may reverse the flow of current through the coil 29 in order to remove any residual magnetism which may tend to hold the work in place on the chuck. This reversal of current need only be momentary.

I claim as my invention:—

1. A magnetic chuck, comprising a rotatable member having two magnetically separate magnetic portions, each of said magnetic portions having poles spaced from the poles of the other portion, one of said magnetic portions having a hub and the other a rim providing an annular space between them, a stationary magnetic member located in said annular space and in close proximity to and magnetically between said hub and rim, and a stationary magnetizing coil in magnetizing relation to said stationary magnetic member and to said magnetic portions.

2. A magnetic chuck, comprising a rotatable member having two magnetically separate magnetic portions, each of said magnetic portions having poles spaced from the poles of the other portion, one of said magnetic portions having a hub and the other a rim providing an annular space between them, and a stationary magnetizing coil located in such annular space and in magnetizing relation to said magnetic portions.

3. A magnetic chuck comprising a rotatable part, a member carried by said part and having two magnetically separate magnetic portions, each of said portions having poles spaced from the poles of the other portion, a stationary member of non-magnetic material supported from said rotatable part, a stationary magnetic member supported from said stationary non-magnetic member, and a magnetizing coil in magnetizing relation to said stationary magnetic member.

4. A magnetic chuck, comprising a rotatably supported face-portion of magnetic material, a second face-portion also of magnetic material, a member of non-magnetic material for supporting said second face-portion from said first face-portion whereby said two face-portions may rotate together, said member forming the sole support for said second face-portion, and a stationary magnetizing coil in magnetizing relation to said face-portions.

In witness whereof, I have hereunto set my hand at Indianapolis, Indiana, this 15th day of June, A. D. one thousand nine hundred and twenty-seven.

JARL M. WEYDELL.